(No Model.)
H. H. HUNTER & E. G. PENDLETON.
FOLDING BICYCLE SUPPORT.
No. 586,902.            Patented July 20, 1897.
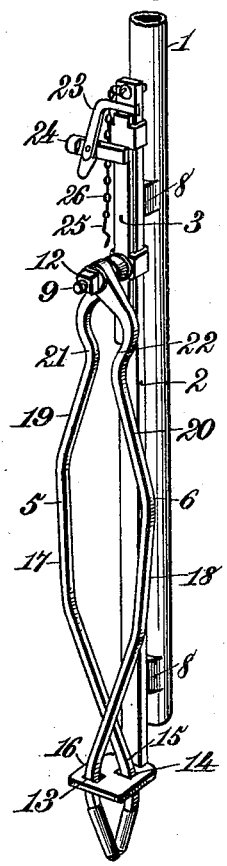
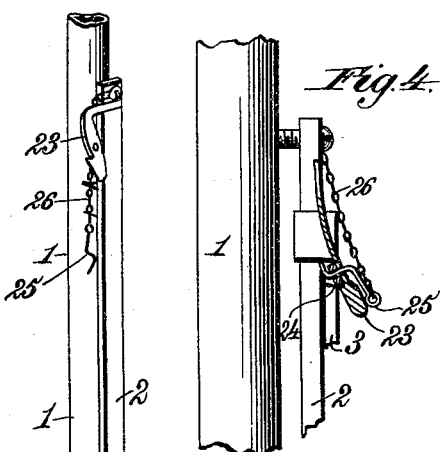
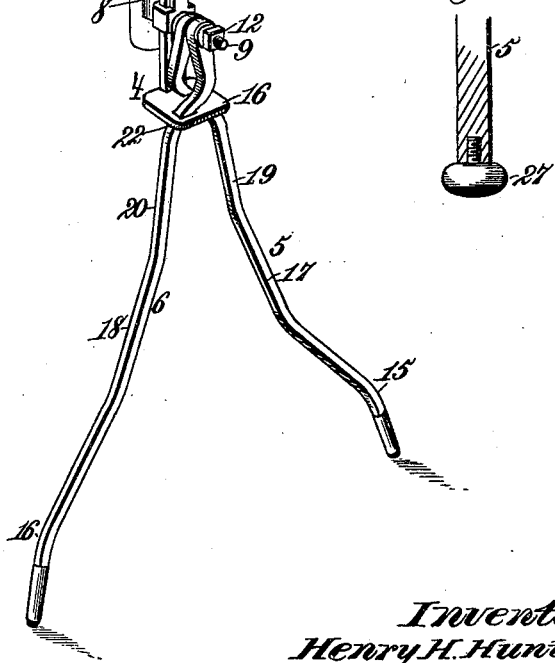
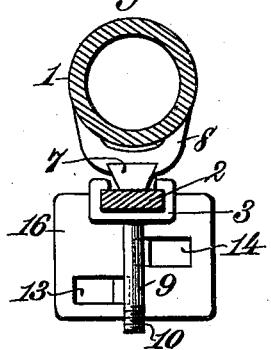
Witnesses.
Robert Everett,
Dennis Sumby.
Inventors.
Henry H. Hunter.
Edward G. Pendleton.
By James L. Norris.
Atty.

UNITED STATES PATENT OFFICE.

HENRY HARRISON HUNTER, OF BERKELEY SPRINGS, WEST VIRGINIA, AND EDWARD GRAY PENDLETON, OF WASHINGTON, DISTRICT OF COLUMBIA.

FOLDING BICYCLE-SUPPORT.

SPECIFICATION forming part of Letters Patent No. 586,902, dated July 20, 1897.

Application filed February 20, 1897. Serial No. 624,373. (No model.)

*To all whom it may concern:*

Be it known that we, HENRY HARRISON HUNTER, residing at Berkeley Springs, in the county of Morgan and State of West Virginia, and EDWARD GRAY PENDLETON, residing at Washington, in the District of Columbia, citizens of the United States, have invented new and useful Improvements in Folding Bicycle-Supports, of which the following is a specification.

This invention has for its object to provide a new and improved bicycle-support having folding and unfolding or extensible and retractible legs which when unfolded or extended lie at opposite sides of the wheel-base and support the bicycle in a perpendicular position, so that it is unnecessary to lean the bicycle to one or the other side to support it when not in use.

The invention also has for its object to provide a new and improved construction of pivoted supporting-legs which when retracted or folded occupy a comparatively small space and when extended or unfolded have their lower ends spread widely apart at opposite sides of the wheel-base to support the weight of the bicycle and hold the same perpendicular.

The invention also has for its object to provide extensible and retractible pivoted legs which are suddenly spread widely apart at or near the limit of their downward extension, the construction being such that the legs occupy a small space when retracted or folded and afford an efficient bracing-support at opposite sides of the wheel-base when they are extended or unfolded.

The invention also has for its object to provide novel, simple, and efficient means for locking the pivoted legs extended and retracted.

To accomplish all these objects, the invention involves the features of construction and the combination or arrangement of parts hereinafter described and claimed, reference being made to the accompanying drawings, in which—

Figure 1 is a detail perspective view showing the improved bicycle-support in its retracted or folded position. Fig. 2 is a similar view showing the support extended or unfolded, as when supporting a bicycle. Fig. 3 is a detail sectional plan view taken on a line directly above the pivot on which the folding and unfolding legs are mounted. Fig. 4 is a detail side elevation showing the means for locking the supporting-legs in their retracted or folded position, and Fig. 5 is a detail view of one of the foot-pieces designed to be applied to the lower ends of the legs to prevent them unduly sinking into soft earth.

In the accompanying drawings the numeral 1 indicates a part of the frame of a bicycle which is to be provided with our improved folding and unfolding support. The part 1 may be the saddle-post or it may be any other part of the bicycle-frame which can be utilized for the purpose in hand.

We prefer to mount the improved support on the saddle-post, but wish it clearly understood that in certain constructions of bicycles it may be desirable or necessary to mount the support on some part other than the saddle-post.

The improved support comprises, essentially, a perpendicular supporting bar or rod 2, a slide 3, movable on the bar or rod, a head 4, provided on the lower end of the bar or rod, and two folding and unfolding or extensible and retractible legs 5 and 6.

The bar or rod 2 is preferably composed of a flat piece of metal, angular or square in cross-section, but obviously this bar or rod may be cylindrical. The bar or rod is secured to the frame 1 in any suitable manner, so that the bar or rod stands offset from the frame and is substantially parallel therewith.

We do not deem it necessary to enter into any detailed description touching the particular means of mounting or securing the bar or rod on the frame 1, as this may be accomplished in any suitable manner and by any suitable devices—such, for instance, as dovetailed projections 7, attached to or forming part of the bar or rod and fitting dovetailed grooves in clips or pieces 8, brazed, soldered, or otherwise connected with the frame 1, as will be understood by reference to Fig. 3. It will be obvious that the bar or rod 2 can be detachably secured to the frame 1 through the medium of suitable clips or clamps, so that the bicycle-support can be attached or detached or adjusted, if desired.

The slide 3 may be of any form suitable for the purpose; but as here shown it is composed of a flattened plate having clips at its upper and lower ends which embrace and slide upon the bar or rod 2. The lower end of the slide is provided in any suitable manner with a horizontally-projecting pivot-pin 9, extending through eyes or perforations in the upper ends of the legs 5 and 6, so that these legs are pivotally mounted on the pivot-pin and can swing laterally toward and from each other. The outer end of the pivot-pin is preferably screw-threaded, as at 10, to receive a screw-nut 12, for the purpose of retaining the legs in position on the pin. A washer is preferably interposed between the nut and the legs, and it is also preferable to place a washer between the slide and the legs, so that the latter will more easily and smoothly operate.

The head 4 on the lower end of the bar or rod 2 is shown in the form of a laterally-extending approximately square plate, but it may be of any form suitable for the purpose. This head is constructed with two square or other suitable sockets or orifices 13 and 14, arranged out of alinement, the socket or orifice 13 being near the outer edge of the head and the socket or orifice 14 being near the bar or rod from which the head projects.

The pivoted legs 5 and 6 extend, respectively, through the sockets or orifices 13 and 14, and the legs are each reversely curved at their lower end portions, as at 15 and 16, and are formed with approximately straight portions 17 and 18, converging upper portions 19 and 20, and somewhat abrupt bends or offsets 21 and 22 in juxtaposition to the pivot-pin on which the legs are pivotally mounted, the construction being such that when the legs are folded or retracted, as in Fig. 1, their lower end portions will extend past each other and their extremities will lie closely together. When the slide 3 is moved downward, the pivoted legs glide through the sockets or orifices 13 and 14 in the head 4, and are not spread laterally to any great extent until the abrupt bends or offsets 21 and 22 enter the sockets or orifices 13 and 14, whereupon these abrupt bends or offsets will suddenly spread the legs widely apart to the position shown in Fig. 2, and as the bends pass through the sockets or orifices and engage under and bear against the lower side of the head 4 these bends or offsets lock the pivoted legs in their extended or unfolded position and support the bicycle in a firm and substantial manner, so that it is maintained upright or approximately perpendicular.

The abrupt bends or offsets 21 and 22, provided in or on the legs in juxtaposition to their pivotal point, are important features of our invention in that they operate to suddenly or swiftly spread the legs apart at or near the limit of their downward motion, and also serve to lock the legs in their extended or unfolded position until the slide 3 is started in its ascent, when the interlocking engagement of the bends or offsets is instantly released and the pivoted legs can be folded or retracted to the position represented in Fig. 1. After the slide is elevated to fold or retract the pivoted legs it is locked in its elevated position through the medium of a spring-catch 23, mounted on the upper end of the bar or rod 2 and constructed to engage a laterally-extending plate or stud 24, secured to and projecting from the slide 3. The plate or stud 24 serves as a handle for raising the slide to its elevated position, but, obviously, any other suitable means for raising the slide may be employed.

To effectually prevent accidental disengagement of the spring-catch from the plate or stud, we propose to construct these parts with perforations for the passage of a locking-pin 25, suspended by a chain 26 from the bar or rod 2 and adapted to be passed through the perforations, as will be understood by reference to Fig. 4, so that the catch 23 cannot be disengaged from the plate or stud 24 until the pin 25 is removed.

For the purpose of preventing the lower ends of the legs from unduly penetrating the earth, particularly where the soil is soft or easily penetrated, we may provide the lower ends of the legs with foot-pieces, one of which is indicated by the numeral 27 in Fig. 5. These foot-pieces may be detachably secured to the lower ends of the legs through the medium of any suitable means, preferably by providing the extremities of the legs with screw-threads to engage screw-threaded sockets in the foot-pieces. The foot-pieces are preferably constructed spherical, but they may be of any other shape suitable for the purpose intended.

Any suitable form of spring-catch may be employed to hold the slide in its elevated position and thereby lock the pivoted legs folded or retracted, but the construction of catch illustrated in the drawings is believed to be practicable.

The pivoted legs are represented as square in cross-section, and the sockets or orifices 13 and 14 are of corresponding shape, but obviously the legs may be cylindrical, and in this event the sockets or orifices will be circular or of any other form or shape which will cause the legs to fold and unfold, as hereinbefore explained.

An important and desirable feature of our invention resides in the fact that when the legs are folded or retracted they occupy a comparatively small space, and are suddenly spread widely apart at or near the limit of their downward motion for the purpose of securing such a wide separation of the lower extremities of the legs that they will afford a firm and substantial supporting-base for the bicycle.

The improved construction and arrangement of parts renders it possible to quickly and conveniently extend and retract the pivotal legs.

All of the parts may be made comparatively light in weight for the purpose of avoiding the addition of undue weight to the bicycle. The pivoted legs may be made of slender steel rods and the slide and its supporting bar or rod may be made of steel, but we wish it clearly understood that all or some of the parts of our invention may be made of aluminium or of any other metal or material sufficiently rigid and strong for the purpose in hand.

Having thus described our invention, what we claim is—

1. The curved legs crossing each other pivoted to the slide and having in juxtaposition to their pivotal point the abruptly-bent offsets 21 and 22, combined with a head 4 having sockets or orifices, whereby the legs are suddenly spread apart at or near the limit of their downward motion and are locked extended by the interlocking of the said abrupt-bent offsets with the said head, substantially as described.

2. The combination with a slide, and a head having sockets or orifices, of a pair of legs pivotally mounted on the slide and constructed with reversely-curved lower extremities 15 and 16, converging upper portions 19 and 20, and abrupt-bent offsets 21 and 22 in juxtaposition to the pivotal point of the legs, whereby the legs occupy a comparatively small space when elevated, and are suddenly spread widely apart at or near the limit of their downward motion and are locked extended by the interlocking of the said abrupt-bent offsets with the said head, substantially as described.

3. The combination of a supporting bar or rod 2, having a head 4, provided with sockets or orifices 13 and 14, a slide 3 having a plate or stud 24, a catch 23 mounted on the upper end of the bar or rod, and pivoted legs 5 and 6 carried by the slide, extending through the sockets or orifices in the head of the bar or rod and constructed with abrupt-bent offsets in juxtaposition to their pivotal point, whereby they are suddenly spread widely apart at or near the limit of their downward motion and are locked extended by the interlocking of the said abrupt-bent offsets with the said head, substantially as described.

4. The combination of a supporting-bar having at its lower end a laterally-projecting head constructed with sockets located at different distances from the bar, a slide movable on said bar and provided with a single pivot-pin, a pair of legs pivotally mounted at their upper ends on said single pivot-pin, constructed with reversely-curved lower extremities, converging upper portions, and abrupt-bent offsets in juxtaposition to the pivot-pin, said legs passing through said sockets of the laterally-projecting head and crossing each other both when the legs are retracted and when they are extended, and locked extended by the interlocking of the said abrupt-bent offsets with said head, substantially as described.

In testimony whereof we have hereunto set our hands in presence of two subscribing witnesses.

HENRY HARRISON HUNTER.
EDWARD GRAY PENDLETON.

Witnesses to signature of H. H. Hunter:
W. H. WEBSTER,
LEWIS ALLEN, Jr.

Witnesses to signature of E. G. Pendleton:
T. T. REESE,
D. R. INGERSOLL.